(12) United States Patent
Steiner et al.

(10) Patent No.: US 9,633,458 B2
(45) Date of Patent: Apr. 25, 2017

(54) METHOD AND SYSTEM FOR REDUCING A POLYGON BOUNDING BOX

(75) Inventors: Walter R. Steiner, Flagler Beach, FL (US); Eric Lum, San Jose, CA (US); Dale L. Kirkland, Madison, AL (US); Steven James Heinrich, Madison, AL (US); David Charles Patrick, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 341 days.

(21) Appl. No.: 13/356,551

(22) Filed: Jan. 23, 2012

(65) Prior Publication Data

US 2013/0187956 A1 Jul. 25, 2013

(51) Int. Cl.
   G09G 5/00 (2006.01)
   G06T 11/40 (2006.01)
   G06T 11/00 (2006.01)

(52) U.S. Cl.
   CPC .............. *G06T 11/40* (2013.01); *G06T 11/00* (2013.01)

(58) Field of Classification Search
   CPC .................................. G06T 11/40; G06T 11/00
   See application file for complete search history.

(56) References Cited

U.S. PATENT DOCUMENTS

| | | | | |
|---|---|---|---|---|
| 4,240,110 A * | 12/1980 | Henry | ............................... | 348/88 |
| 5,338,200 A * | 8/1994 | Olive | ............................... | 434/43 |
| 5,583,975 A * | 12/1996 | Naka | ........................ | G06T 15/06 |
| | | | | 345/424 |
| 5,757,321 A * | 5/1998 | Billyard | ........................ | 345/426 |
| 5,987,567 A * | 11/1999 | Rivard | ................ | G06F 12/0875 |
| | | | | 345/501 |
| 5,999,185 A * | 12/1999 | Kato et al. | ..................... | 345/420 |
| 6,057,855 A * | 5/2000 | Barkans | ................ | G06T 11/001 |
| | | | | 345/441 |
| 6,184,893 B1 * | 2/2001 | Devic | ..................... | G06T 11/40 |
| | | | | 345/428 |
| 6,323,874 B1 * | 11/2001 | Gossett | .......................... | 345/619 |
| 6,342,886 B1 * | 1/2002 | Pfister et al. | .................. | 345/424 |
| 6,424,345 B1 * | 7/2002 | Smith et al. | ................... | 345/423 |
| 6,427,030 B1 * | 7/2002 | Williams et al. | ............. | 382/252 |
| 6,437,780 B1 * | 8/2002 | Baltaretu | ................ | G06T 11/40 |
| | | | | 345/423 |

(Continued)

OTHER PUBLICATIONS

Akenine-Moller, An Extremely Inexpensive Multisampling Scheme, 2003.*

(Continued)

*Primary Examiner* — Devona Faulk
*Assistant Examiner* — Charles L Beard
(74) *Attorney, Agent, or Firm* — Artegis Law Group, LLP

(57) ABSTRACT

In a graphics processing pipeline, a processing unit establishes a bounding box around a polygon in order to identify sample points that are covered by the polygon. For a given sample point included within the bounding box, the processing unit constructs a set of lines that intersect at the sample point, where each line in the set of lines is parallel to at least one side of the polygon. When all vertices of the polygon reside on one side of at least one line in the set of lines, the processing unit may reduce the size of the bounding box to exclude the sample point.

20 Claims, 14 Drawing Sheets

(56) References Cited

U.S. PATENT DOCUMENTS

| | | | | |
|---|---|---|---|---|
| 6,501,483 | B1* | 12/2002 | Wong | G06T 11/001 345/441 |
| 6,624,823 | B2* | 9/2003 | Deering | 345/613 |
| 6,680,735 | B1* | 1/2004 | Seiler | G06T 15/005 345/419 |
| 6,693,637 | B2* | 2/2004 | Koneru et al. | 345/501 |
| 6,795,080 | B2* | 9/2004 | Lavelle et al. | 345/552 |
| 6,819,332 | B2* | 11/2004 | Baldwin | 345/611 |
| 6,894,689 | B1* | 5/2005 | Greene et al. | 345/422 |
| 6,900,818 | B1* | 5/2005 | Moffitt et al. | 345/622 |
| 6,947,057 | B2* | 9/2005 | Nelson | G06T 11/40 345/441 |
| 6,952,206 | B1* | 10/2005 | Craighead | 345/422 |
| 6,975,318 | B2* | 12/2005 | Junkins et al. | 345/423 |
| 7,023,437 | B1* | 4/2006 | Voorhies et al. | 345/420 |
| 7,050,068 | B1* | 5/2006 | Bastos | G06T 11/001 345/611 |
| 7,081,903 | B2* | 7/2006 | McNamara et al. | 345/614 |
| 7,088,358 | B2* | 8/2006 | Aharon et al. | 345/419 |
| 7,212,204 | B2* | 5/2007 | Farinelli | 345/421 |
| 7,292,239 | B1* | 11/2007 | Moreton et al. | 345/419 |
| 7,292,242 | B1* | 11/2007 | Wittenbrink et al. | 345/421 |
| 7,292,254 | B1* | 11/2007 | Yue et al. | 345/620 |
| 7,400,325 | B1* | 7/2008 | Gimby | G06T 15/40 345/418 |
| 7,403,208 | B1* | 7/2008 | Bastos | G06T 11/001 345/613 |
| 7,436,414 | B2* | 10/2008 | Jacobson | 345/620 |
| 7,468,726 | B1* | 12/2008 | Wloka | G06T 15/40 345/419 |
| 7,474,308 | B2* | 1/2009 | Deering | 345/419 |
| 7,554,538 | B2* | 6/2009 | Wexler et al. | 345/418 |
| 7,633,506 | B1* | 12/2009 | Leather | G06T 15/005 345/505 |
| 7,737,994 | B1* | 6/2010 | Wasserman | G06T 1/20 345/505 |
| 7,791,605 | B2* | 9/2010 | Jiao et al. | 345/441 |
| 7,800,632 | B2* | 9/2010 | Qi et al. | 345/622 |
| 7,834,872 | B2* | 11/2010 | Fenney et al. | 345/421 |
| 7,916,155 | B1* | 3/2011 | Moreton | G06T 15/503 345/421 |
| 7,920,139 | B2* | 4/2011 | Nystad | G06T 11/001 345/419 |
| 8,004,522 | B1* | 8/2011 | Toksvig | G06T 15/503 345/426 |
| 8,044,971 | B2* | 10/2011 | Nystad | G06T 11/40 345/589 |
| 8,179,399 | B2* | 5/2012 | Barone | 345/581 |
| 8,199,146 | B2* | 6/2012 | Nystad et al. | 345/419 |
| 8,264,503 | B1* | 9/2012 | Parenteau et al. | 345/620 |
| 8,325,203 | B1* | 12/2012 | Donham | G06T 11/40 345/611 |
| 8,345,064 | B2* | 1/2013 | Min et al. | 345/619 |
| 8,427,487 | B1* | 4/2013 | Crow | 345/506 |
| 8,477,134 | B1* | 7/2013 | Vignon et al. | 345/421 |
| 8,493,383 | B1* | 7/2013 | Cook et al. | 345/419 |
| 8,497,875 | B2* | 7/2013 | Lee | 345/620 |
| 8,537,168 | B1* | 9/2013 | Steiner et al. | 345/506 |
| 8,547,395 | B1* | 10/2013 | Hutchins | G06T 15/005 345/611 |
| 8,704,836 | B1* | 4/2014 | Rhoades | G06T 15/005 345/502 |
| 9,230,362 | B2* | 1/2016 | Lum | G06T 15/503 |
| 9,230,363 | B2* | 1/2016 | Lum | G06T 9/00 |
| 9,336,002 | B2* | 5/2016 | Hakura | G06T 15/005 |
| 2002/0000988 | A1* | 1/2002 | Nelson | G06T 11/40 345/443 |
| 2002/0064233 | A1* | 5/2002 | Terreault et al. | 375/261 |
| 2002/0085010 | A1* | 7/2002 | McCormack et al. | 345/545 |
| 2002/0097438 | A1* | 7/2002 | Schweid et al. | 358/3.05 |
| 2002/0130886 | A1* | 9/2002 | Baldwin | G06T 15/005 345/611 |
| 2002/0136446 | A1* | 9/2002 | Slavin | 382/162 |
| 2002/0140706 | A1* | 10/2002 | Peterson | G06T 11/40 345/611 |
| 2003/0122819 | A1* | 7/2003 | Koneru | G06T 11/40 345/421 |
| 2003/0122829 | A1* | 7/2003 | McNamara | G06T 15/80 345/441 |
| 2003/0122850 | A1* | 7/2003 | Koneru et al. | 345/620 |
| 2003/0142104 | A1* | 7/2003 | Lavelle et al. | 345/552 |
| 2003/0169277 | A1* | 9/2003 | Patton | 345/620 |
| 2003/0206179 | A1* | 11/2003 | Deering | 345/589 |
| 2004/0100466 | A1* | 5/2004 | Deering | 345/428 |
| 2004/0125103 | A1* | 7/2004 | Kaufman et al. | 345/419 |
| 2004/0130552 | A1* | 7/2004 | Duluk et al. | 345/506 |
| 2004/0161146 | A1* | 8/2004 | Van Hook | H04N 1/644 382/166 |
| 2004/0164985 | A1* | 8/2004 | Kato et al. | 345/441 |
| 2004/0227772 | A1* | 11/2004 | Huang et al. | 345/622 |
| 2005/0104898 | A1* | 5/2005 | Moffitt et al. | 345/622 |
| 2005/0285850 | A1* | 12/2005 | Heim et al. | 345/418 |
| 2006/0033745 | A1* | 2/2006 | Koselj et al. | 345/519 |
| 2006/0176316 | A1* | 8/2006 | Nagasaki et al. | 345/621 |
| 2006/0290715 | A1* | 12/2006 | Cui et al. | 345/620 |
| 2007/0097145 | A1* | 5/2007 | Akenine-Moller | G06T 3/4007 345/611 |
| 2007/0109320 | A1* | 5/2007 | Skibak | G06T 11/001 345/611 |
| 2008/0158252 | A1* | 7/2008 | Iourcha et al. | 345/620 |
| 2008/0309659 | A1* | 12/2008 | Jacobson | 345/418 |
| 2009/0046098 | A1* | 2/2009 | Barone et al. | 345/420 |
| 2009/0147016 | A1* | 6/2009 | Barone et al. | 345/581 |
| 2009/0167763 | A1* | 7/2009 | Waechter et al. | 345/426 |
| 2009/0174706 | A1* | 7/2009 | Howson | G06T 1/20 345/419 |
| 2009/0195552 | A1* | 8/2009 | Nystad | G06T 11/40 345/611 |
| 2009/0195555 | A1* | 8/2009 | Nystad et al. | 345/620 |
| 2009/0256845 | A1* | 10/2009 | Sevastianov et al. | 345/426 |
| 2010/0066744 | A1* | 3/2010 | Xianghui | G06T 11/40 345/441 |
| 2010/0201707 | A1* | 8/2010 | Rasmussen et al. | 345/620 |
| 2012/0229464 | A1* | 9/2012 | Fishwick | 345/423 |
| 2013/0038628 | A1* | 2/2013 | Look et al. | 345/622 |
| 2013/0257885 | A1* | 10/2013 | Vaidyanathan | G06T 15/503 345/582 |
| 2014/0098084 | A1* | 4/2014 | Subag | G06T 11/40 345/419 |
| 2014/0267300 | A1* | 9/2014 | Barber | G06T 11/40 345/441 |
| 2014/0333623 | A1* | 11/2014 | Ozdas | G06T 15/08 345/426 |
| 2015/0054836 | A1* | 2/2015 | Bolz | G06T 11/40 345/505 |
| 2015/0287239 | A1* | 10/2015 | Berghoff | G06F 9/48 345/422 |
| 2016/0133045 | A1* | 5/2016 | Akenine-Moller | G06T 11/40 345/421 |
| 2016/0314618 | A1* | 10/2016 | Yang | G06T 1/60 |

OTHER PUBLICATIONS

Lensch, Computer Graphics Rasterization and Clipping, 2007.*
Hasselgren, A Family Inexpensive Sampling Schemes, 2005.*
Cutler, The Traditional Graphics Pipeline, http://www.cs.rpi.edu/~cutler/classes/advancedgraphics/S09/lectures/15_Graphics_Pipeline.pdf, 2009.*
Zhang, Fast Triangle Rasterization Using Irregular Z-Buffer On CUDA, 2010.*
Zhang, Image Coding on Quincunx Lattice with Adaptive Lifting and Interpolation, 2007.*
Owens, EEC277 Graphics Architecture Rasterization, 2008.*
Hasselgren, Performance Improvements for the Rasterization Pipeline, 2009.*

* cited by examiner

METHOD AND SYSTEM FOR REDUCING A POLYGON BOUNDING BOX

BACKGROUND OF THE INVENTION

Field of the Invention

The present invention generally relates to graphics processing and more specifically to a method and system for reducing a polygon bounding box.

Description of the Related Art

A conventional graphics processing unit (GPU) implements a bounding box to rasterize a polygon into pixels that can be processed and then displayed on a display screen. The bounding box surrounds the polygon and may indicate which pixels are covered by that polygon, as illustrated by conceptual diagram 500 shown in FIG. 5. As shown, a triangle 502 partially covers pixels 512, 514, 516, and 518. A bounding box 520 surrounds the triangle 502 and includes pixel centers 512, 514, 516, and 518, indicating that corresponding pixels 504, 506, 508, and 510 should be processed in conjunction with triangle 502.

One problem with conventional bounding box techniques is that pixels not actually covered by a polygon are often identified by the bounding box and then processed for display. Referring again to FIG. 5, pixel centers 512 and 514 are included within the bounding box 520, indicating that pixels 504 and 506 should be processed. However, triangle 502 does not actually cover pixel centers 512 and 514, and so pixels 504 and 506 do not actually need to be processed in conjunction with triangle 502. Processing extraneous pixels wastes GPU resources and decreases GPU throughput.

Accordingly, what is needed in the art is an improved bounding box technique.

SUMMARY OF THE INVENTION

Embodiments of the invention include a computer-implemented method for culling sample points associated with a polygon having N edges and N vertices, including establishing a bounding box that encompasses the polygon, identifying a sample point included within the bounding box, constructing a set of lines that intersect one another at the sample point, determining that each of the N vertices of the polygon resides on one side of at least one line in the set of lines, and reducing the size of the bounding box to exclude the sample point.

One advantage of the invention is that sample points included within the bounding box but not actually covered by the polygon may be excluded from the bounding box, thereby reducing the number of sample points that need to be processed in conjunction with the polygon.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
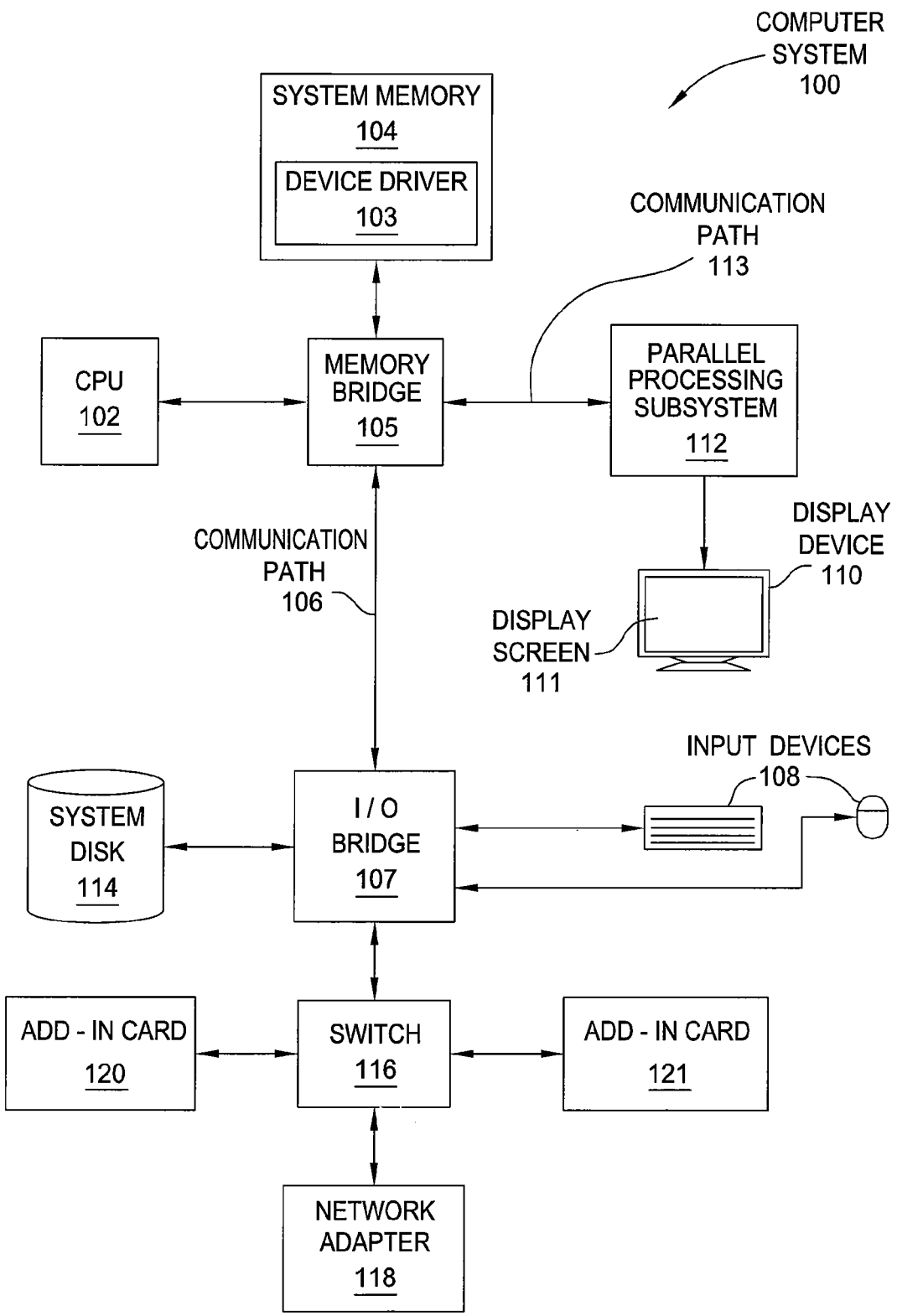
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
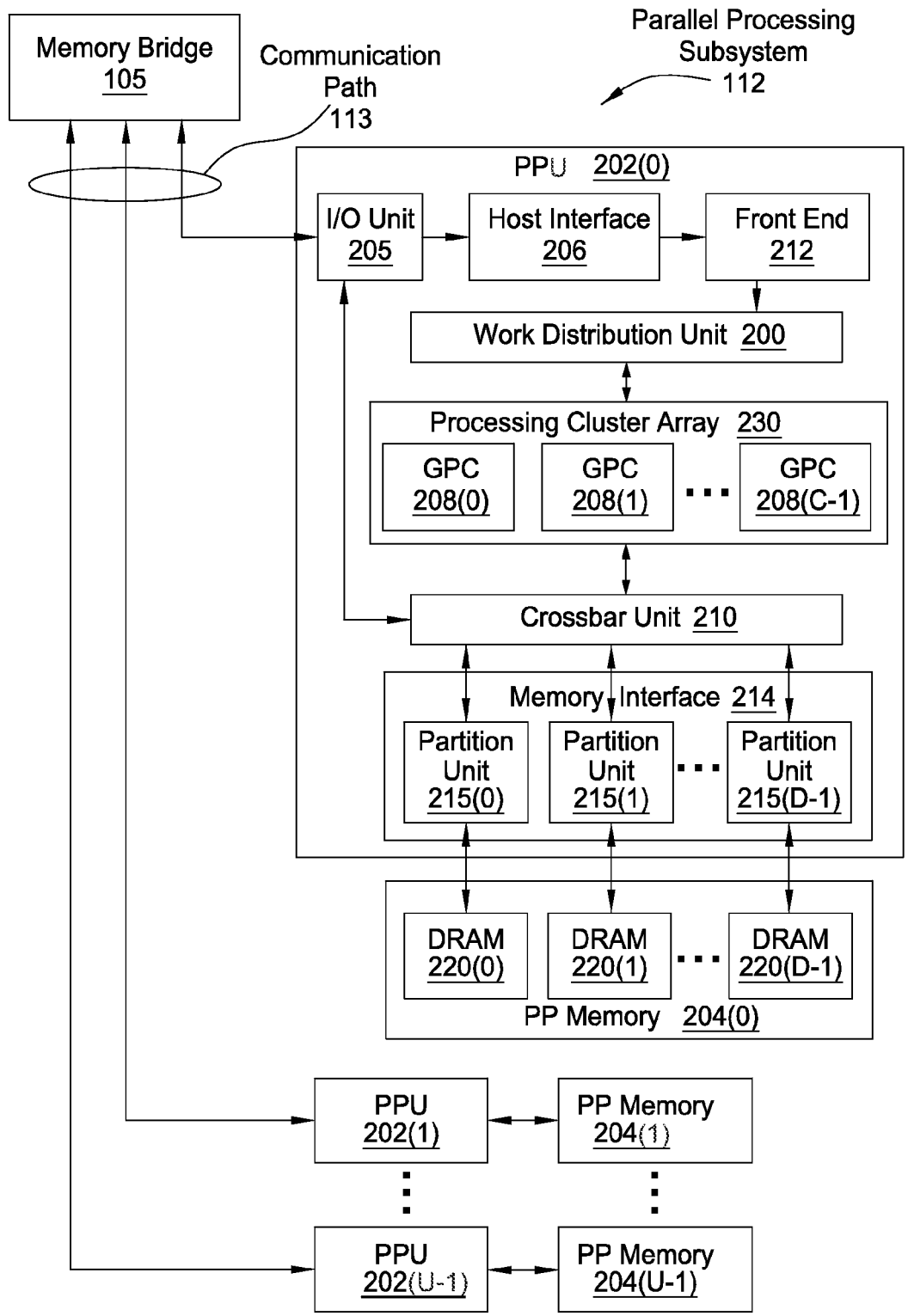
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
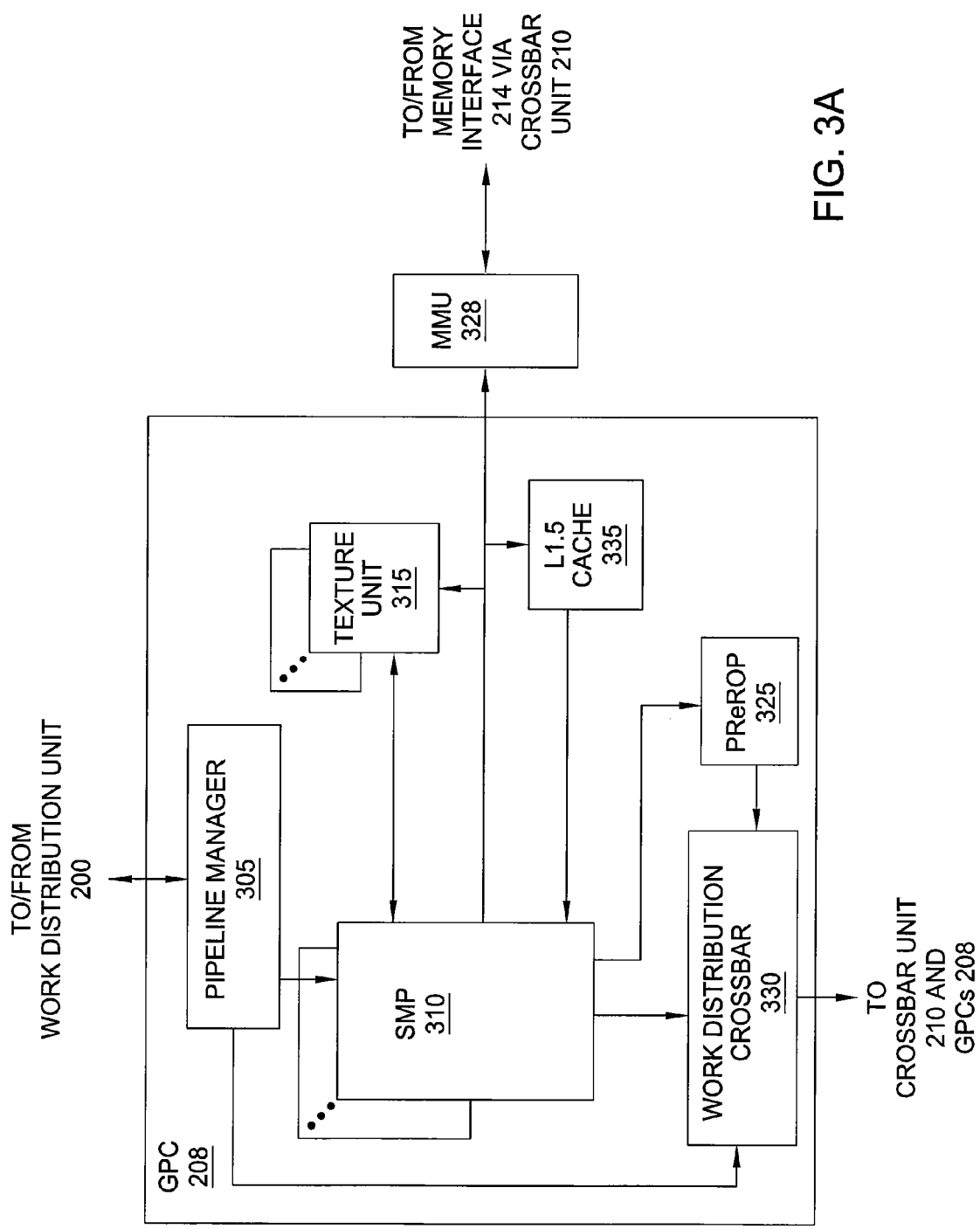
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SMPs) 310. Pipeline manager 305 may also be configured to control a work distribution crossbar 330 by specifying destinations for processed data output by SMPs 310.

In one embodiment, each GPC 208 includes a number M of SMPs 310, where M≥1, each SMP 310 configured to process one or more thread groups. Also, each SMP 310 advantageously includes an identical set of functional execution units (e.g., arithmetic logic units, and load-store units, shown as Exec units (not shown) and LSUs (not shown) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SMP 310 is referred to herein as a "thread group." As used herein, a "thread group" refers to a group of threads concurrently executing the same program on different input data, with one thread of the group being assigned to a different processing engine within an SMP 310. A thread group may include fewer threads than the number of processing engines within the SMP 310, in which case some processing engines will be idle during cycles when that thread group is being processed. A thread group may also include more threads than the number of processing engines within the SMP 310, in which case processing will take place over consecutive clock cycles. Since each SMP 310 can support up to G thread groups concurrently, it follows that up to G*M thread groups can be executing in GPC 208 at any given time.

Additionally, a plurality of related thread groups may be active (in different phases of execution) at the same time within an SMP 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SMP 310, and m is the number of thread groups simultaneously active within the SMP 310. The size of a CTA is generally determined by the programmer and the amount of hardware resources, such as memory or registers, available to the CTA.

Each SMP 310 contains an L1 cache (not shown) or uses space in a corresponding L1 cache outside of the SMP 310 that is used to perform load and store operations. Each SMP 310 also has access to L2 caches within the partition units 215 that are shared among all GPCs 208 and may be used to transfer data between threads. Finally, SMPs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SMP 310, including instructions, uniform data, and constant data, and provide the requested data to SMP 310. Embodiments having multiple SMPs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SMP 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SMP 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SMP 310 and is fetched from an L2 cache, parallel processing memory 204, or system memory 104, as needed. Each SMP 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SMP 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMPs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
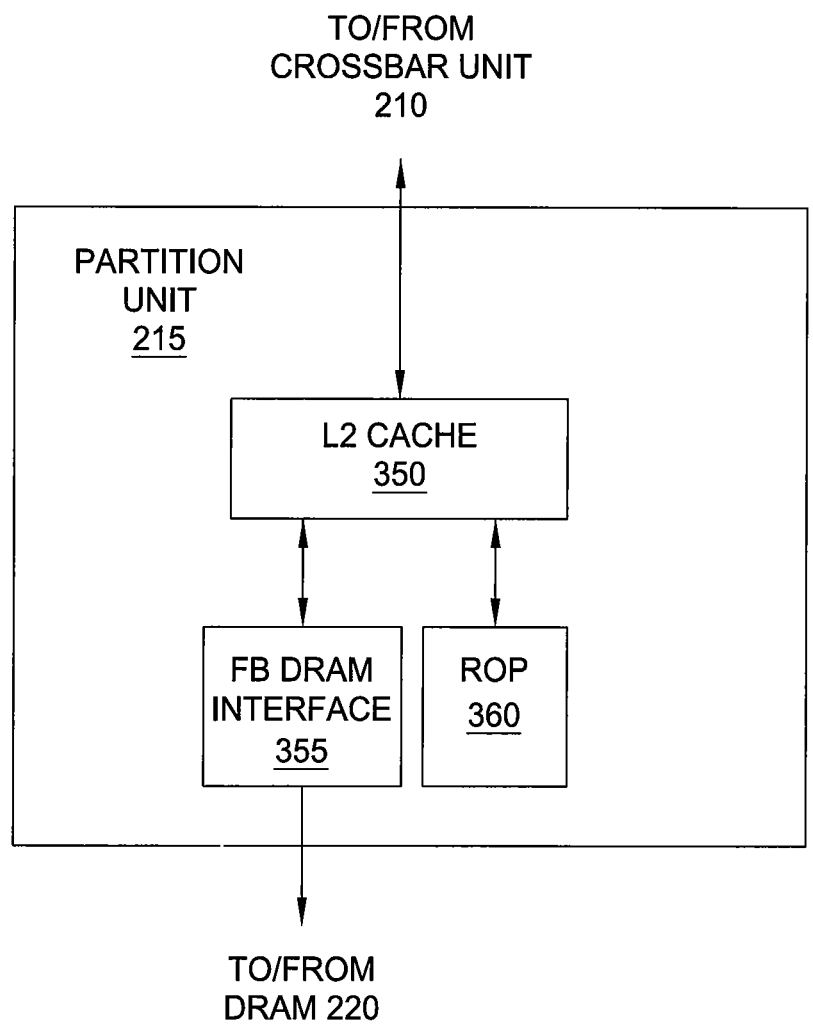
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
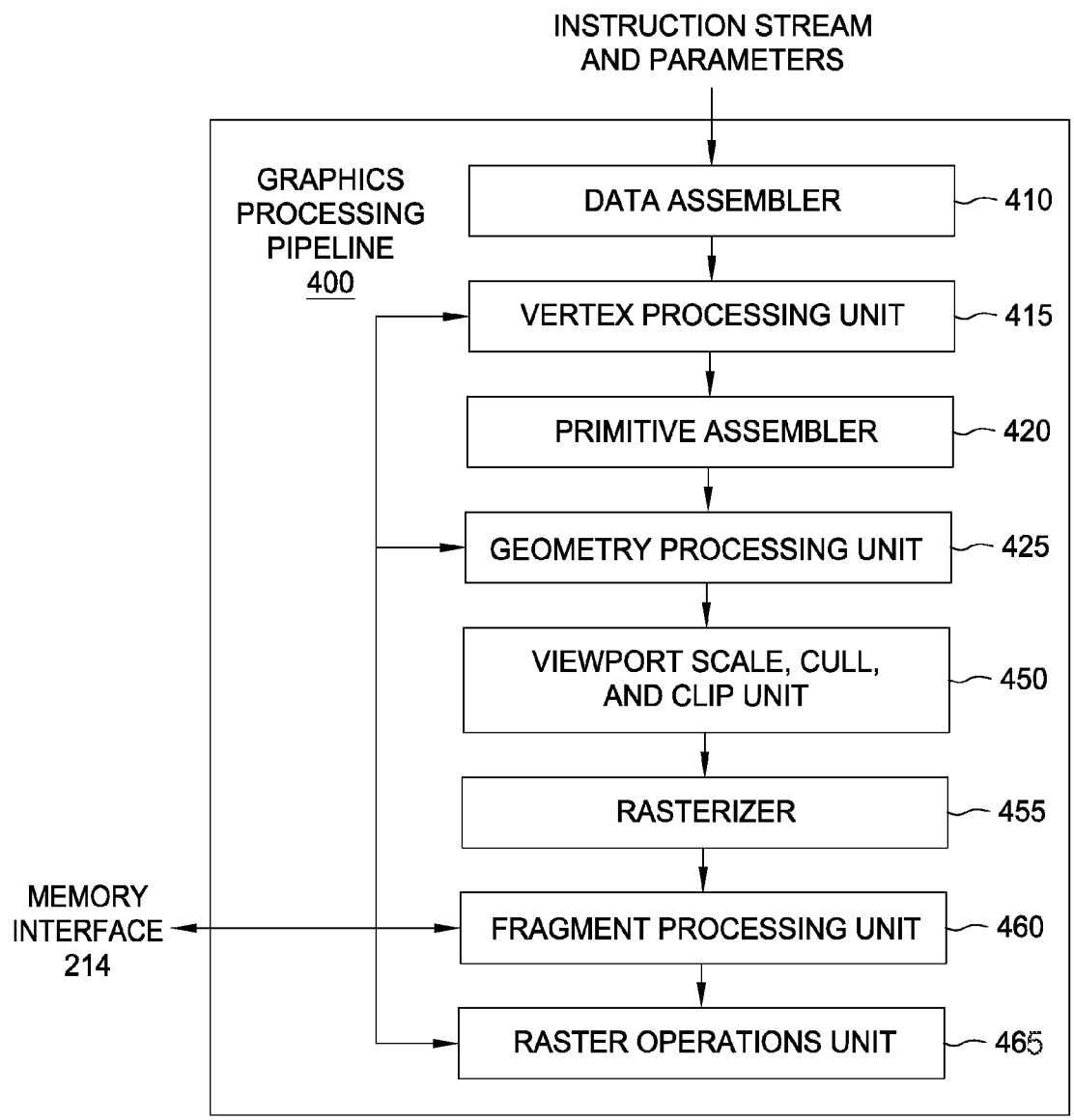
FIG. 4 is a conceptual diagram of a graphics processing pipeline that one or more of the PPUs of FIG. 2 can be configured to implement, according to one embodiment of the present invention.
Figure 5:
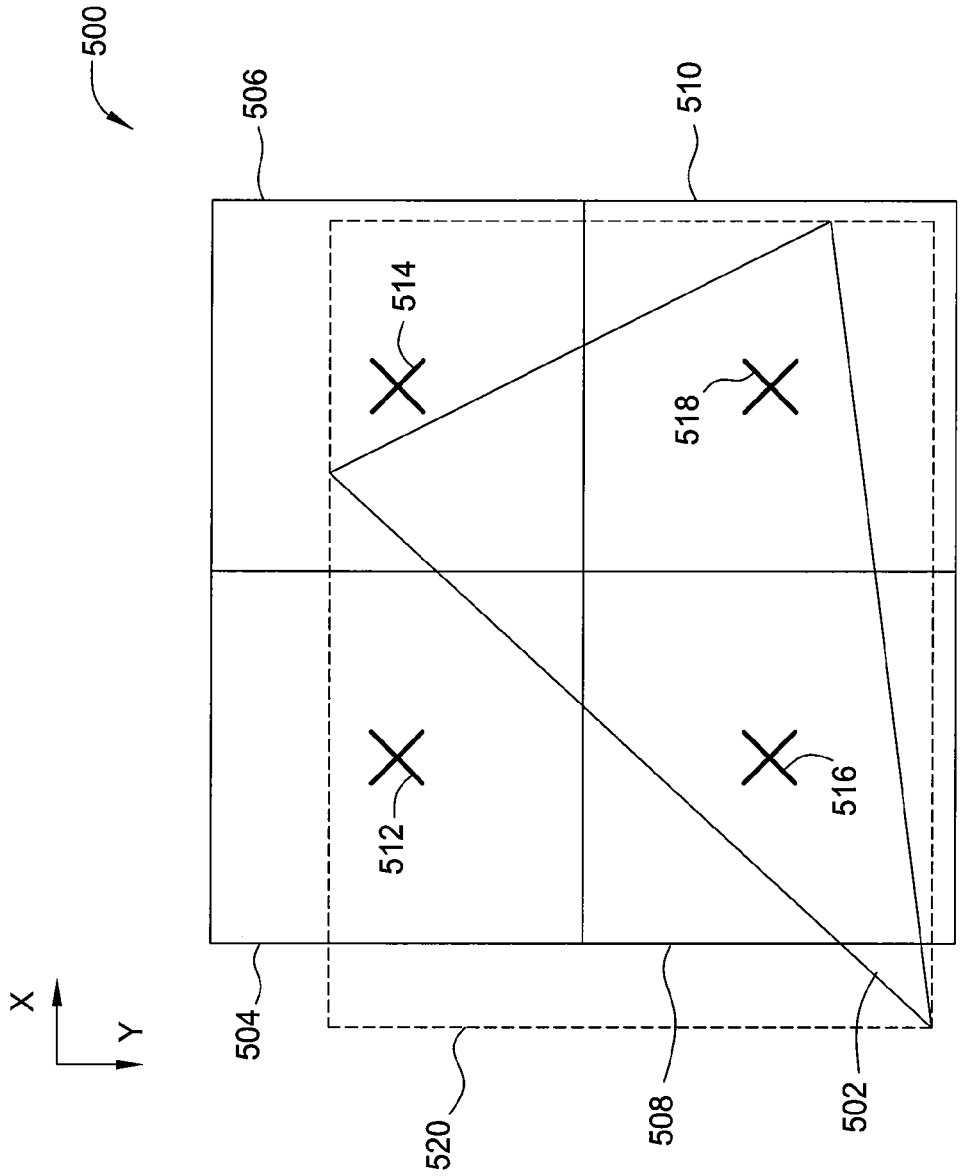
FIG. 5 is a conceptual diagram illustrating a conventional bounding box, according to the prior art.

FIG. 4 is a conceptual diagram of a graphics processing pipeline 400, that one or more of the PPUs 202 of FIG. 2 can be configured to implement, according to one embodiment of the present invention. For example, one of the SMPs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache (not shown), parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

In one embodiment, when implementing graphics processing pipeline 400 described above, SMP 310 may be configured to implement a bounding box in order to identify a set of pixels that are covered by a given polygon. SMP 310 may implement the bounding box when performing the functions of one of the different units described above in conjunction with FIG. 4. For example, SMP 310 could implement the bounding box when performing the functions of primitive assembler 420, geometry processing unit 425, viewport scale, cull, and clip unit 450, or rasterizer 455. As discussed in greater detail below in conjunction with FIGS. 6A-9, SMP 310 is configured to collapse or reduce the size of the bounding box in order to cull polygons from processing that do not cover any pixel sample points, according to various embodiments of the invention.

Polygon Bounding Box Reduction

Figure 6:
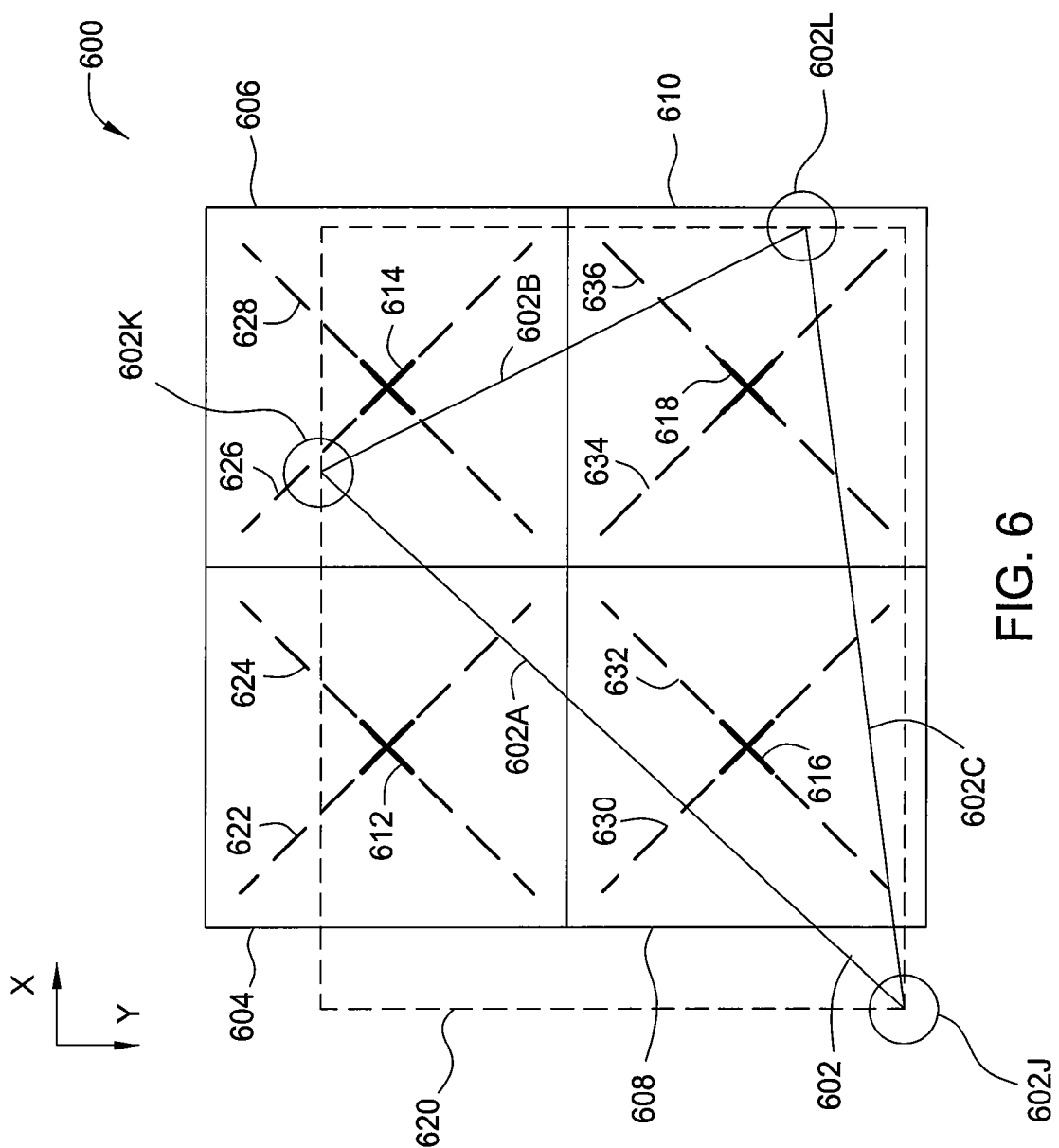
FIG. 6 is a conceptual diagram illustrating a technique for reducing the size of a bounding box, according to one embodiment of the present invention.

FIG. 6 is a conceptual diagram 600 illustrating a technique for reducing the size of a bounding box 620, according to one embodiment of the present invention. As shown, conceptual diagram 600 includes a triangle 602 that partially covers pixels 604, 606, 608, and 610, and is surrounded by a bounding box 620. Triangle 602 includes edges 602A, 602B, and 602C as well as vertices 602J, 602K, and 602L. Pixels 604, 606, 608, and 610 include sample points 612, 614, 616, and 618, respectively, that each represents a position within the corresponding pixel where the color value of the corresponding pixel may be sampled.

Sample point 612 represents a position within pixel 604 where the color value of pixel 604 may be sampled. Likewise, sample point 614 represents a position within pixel 606 where the color value of pixel 606 may be sampled, sample point 616 represents a position within pixel 608 where the color value of pixel 608 may be sampled, and sample point 618 represents a position within pixel 610 where the color value of pixel 610 may be sampled. In one embodiment, sample points 612, 614, 616, and 618 are positioned at the center of the pixel associated with each of those sample points. In another embodiment, each of pixels 604, 606, 608, and 610 includes multiple sample points located at different positions.

SMP 310 generates bounding box 620 in order to identify sample points that are covered by triangle 602. Once a set of sample points is identified, the pixels corresponding to those sample points may be shaded and output for display. In some situations, the size of bounding box 620 may be reduced in order to exclude sample points and/or pixels that are not covered by triangle 602. For example, sample points 612 and 614 are not covered by triangle 602, and so the size of bounding box 620 may be reduced to exclude those sample points. Pixels 604 and 606 associated with sample points 612 and 614, respectively, may then be excluded from being processed in conjunction with triangle 602.

In order to reduce the size of bounding box 620 to exclude a given sample point, SMP 310 first constructs a set of lines that intersect at the sample point. If all vertices 602J-602L of triangle 602 reside on one side of at least one line in the set of lines, then the size of bounding box 620 can be reduced to exclude the sample point, as described in greater detail below.

As shown in conceptual diagram 600, lines 622 and 624 intersect at sample point 612, lines 626 and 628 intersect at sample point 614, lines 630 and 632 intersect at sample point 616, and lines 634 and 636 intersect at sample point 618. In practice, SMP 310 may construct lines 622, 624, 626, 628, 630, 632, 634, and 636 by determining a set of equations that describe those lines. Those skilled in the art will recognize that lines 622, 624, 626, 628, 630, 632, 634, and 636 are illustrated conceptually as line segments having finite length for the sake of simplicity.

As also shown in conceptual diagram 600, all vertices 602J-602L of triangle 602 reside on one side of line 624 corresponding to sample point 612, and, similarly, all vertices 602J-602L of triangle 602 reside on one side of line 626 corresponding to sample point 614. Consequently, SMP 310 may reduce the size of bounding box 620 to exclude sample points 612 and 614 and, thus, exclude pixels 604 and 606 from being processed in conjunction with triangle 602. When a sample point is excluded from being processed, or culled, as is known in the art, that sample point may be discarded and not processed by the remainder of graphics processing pipeline 400.

Those skilled in the art will recognize that the techniques described above for reducing the size of a bounding box are applicable to pixels having more than one sample point and for any number of pixels. For example, the SMP 310 could implement the above-described technique in order to reduce the size of a bounding box that encloses 6 pixels that each includes 4 sample points. Accordingly, other configurations of pixels and sample points fall within the scope of the present invention. In embodiments where each pixel includes more than one sample point, SMP 310 may reduce the size of bounding box 620 to exclude all sample points within a given pixel, and then exclude that pixel from further processing. In addition, the techniques described herein are applicable to a bounding box that surrounds any type of N-edged polygon having N vertices, and are discussed in regards to a triangle for the sake of simplicity.

In one embodiment, the lines intersecting a given sample point are perpendicular to one another and reside at a 45 degree angle to at least one edge of the pixel within which those lines reside. In another embodiment, SMP 310 reduces the size of bounding box 602 when all sample points in a row or column of sample points may be excluded. For example, a row of sample points that includes sample points 612 and 614 may be excluded, as a whole, since sample points 612 and 614 may each be excluded. In yet another embodiment, SMP 310 constructs more than two intersecting lines for a given sample point, as described in greater detail below in conjunction with FIGS. 7A-7C.

Figure 7A:
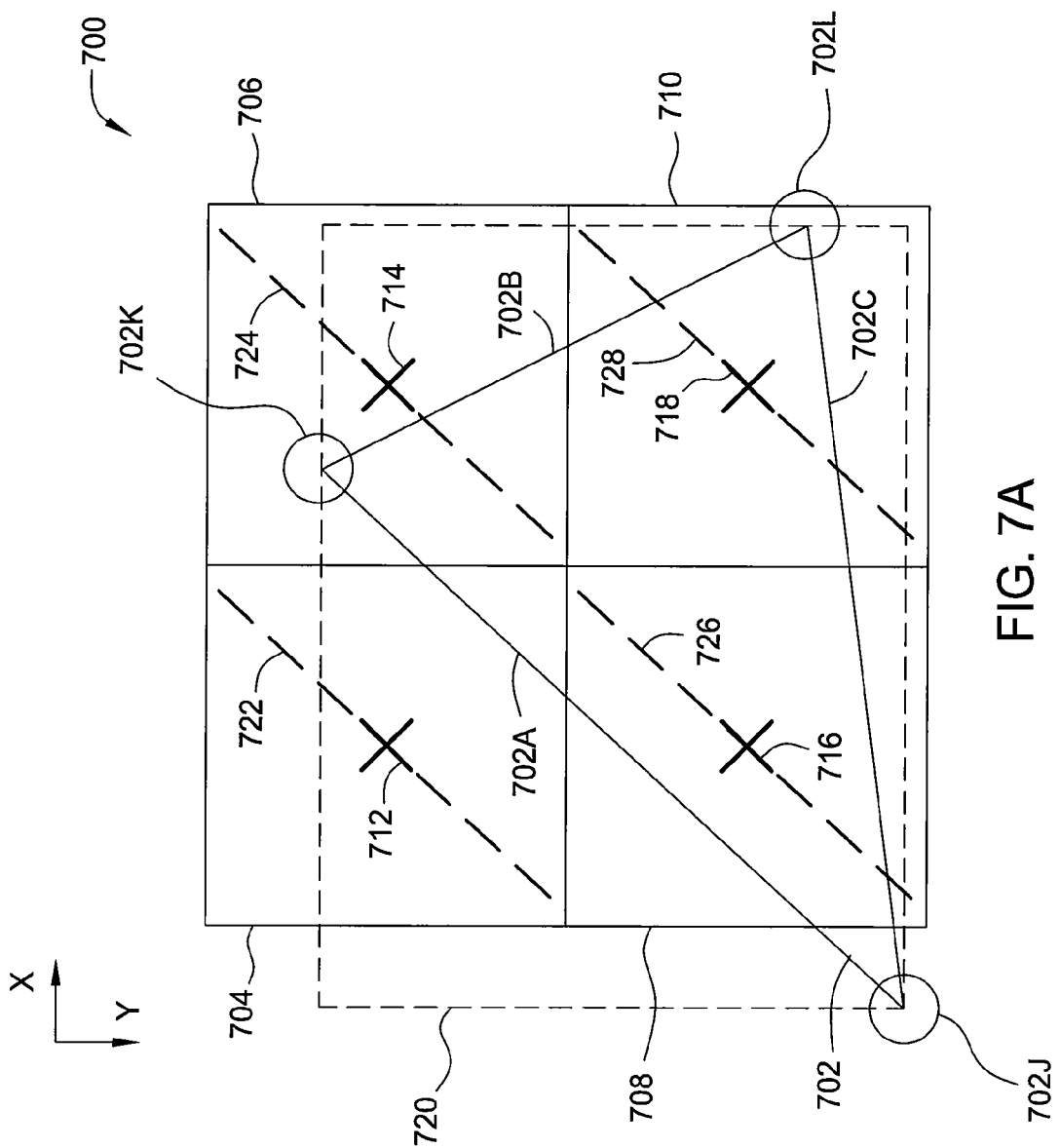
FIGS. 7A-7C are conceptual diagrams illustrating another technique for reducing the size of a bounding box, according to one embodiment of the invention.

FIG. 7A is a conceptual diagram illustrating another technique for reducing the size of a bounding box, according to one embodiment of the invention. As shown, conceptual diagram 700 is substantially similar to conceptual diagram 600 and includes a triangle 702 that partially covers pixels 704, 706, 708, and 710, and is surrounded by a bounding box 720. Triangle 702 includes edges 702A, 702B, and 702C, as well as vertices 702J, 702K, and 702L. Pixels 704, 706, 708, and 710 include sample points 712, 714, 716, and 718, respectively, that each represents a position within a corresponding pixel where the color value of the corresponding pixel may be sampled.

In like fashion as discussed above in conjunction with FIG. 6, SMP 310 generates bounding box 720 in order to identify sample points that are covered by triangle 702. SMP 310 may reduce the size of bounding box 720 to exclude sample points that are not covered by triangle 702, such as, e.g., sample points 712 and 714. In order to reduce the size of bounding box 620 to exclude a given sample point, SMP 310 first constructs a set of lines that intersect at the sample point, where each line in the set of lines is parallel to one of the edges 702A, 702B, or 702C of triangle 702. If all vertices 702J-702L of triangle 702 reside on one side of at least one line in the set of lines, then the size of bounding box 720 can be reduced to exclude the sample point, as further described herein.

As shown in conceptual diagram 700, lines 722, 724, 726, and 728 intersect at sample points 712, 714, 716, and 718, respectively, and are each substantially parallel to edge 702A of triangle 702. Since all vertices 702J-702L of triangle 702 reside on one side of line 722, SMP 310 may reduce the size of bounding box 720 to exclude sample point 712. SMP 310 also constructs additional lines for each sample point that are parallel to one of edges 702B-702C of triangle 702, as described in greater detail below in conjunction with FIGS. 7B-7C.

Figure 7B:
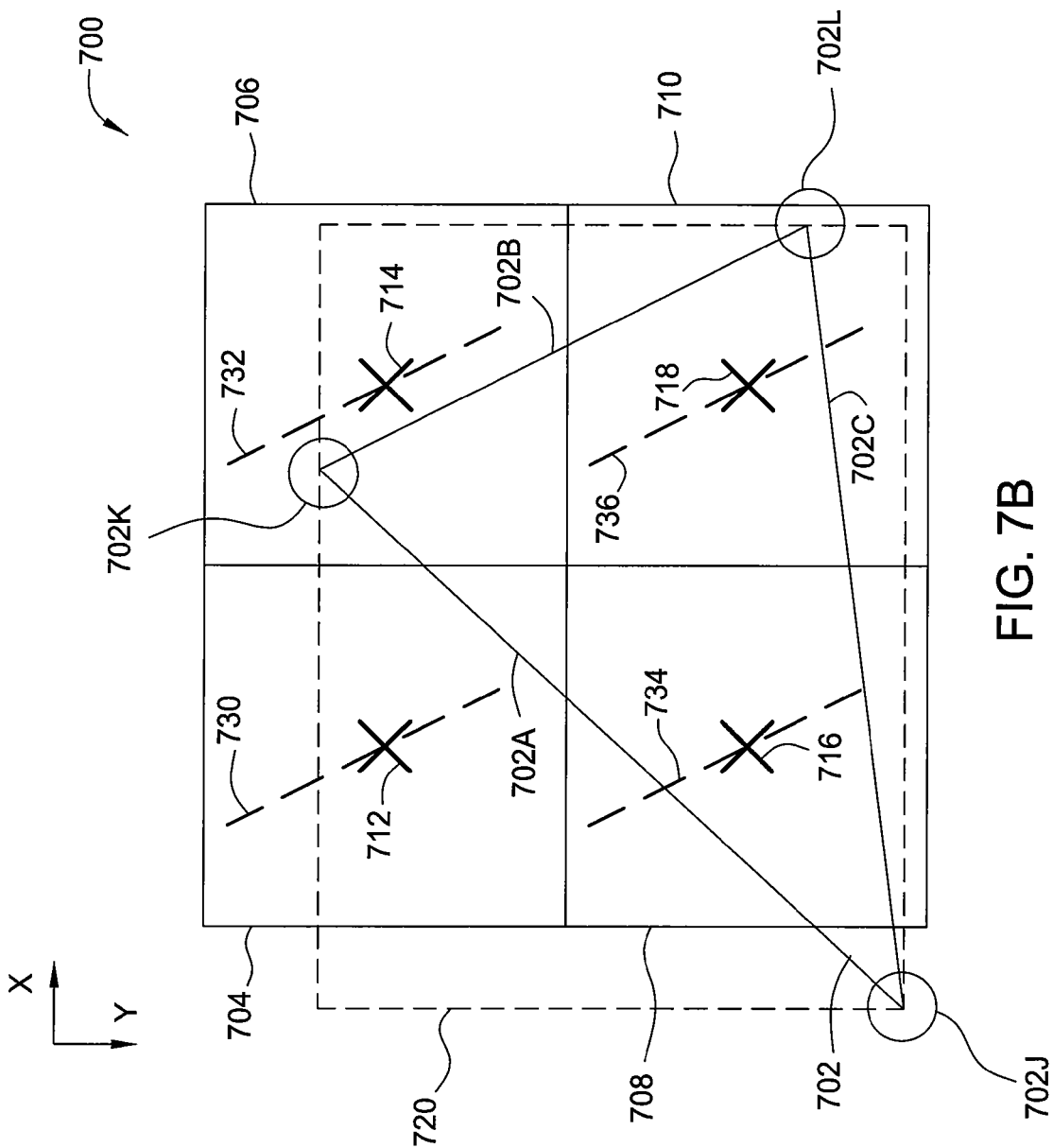

FIG. 7B illustrates conceptual diagram 700 of FIG. 7A in greater detail, according to one embodiment of the invention. As shown, conceptual diagram 700 includes some of the same elements as shown in FIG. 7A. In addition, conceptual diagram 700 includes lines 730, 732, 734, and 736 that cross sample points 712, 714, 716, and 718, respectively, and are each substantially parallel to edge 702B of triangle 702. Since all vertices 702J-702L of triangle 702 reside on one side of line 732, SMP 310 may reduce the size of bounding box 720 to exclude sample point 714.

Since sample point 712 may be excluded from bounding box 720 based on the comparison described above in conjunction with FIG. 7A, SMP 310 may forego constructing line 730 in certain embodiments. In such embodiments, SMP 310 may only construct lines for sample points that have not already been excluded. In other embodiments, SMP 310 reduces the size of bounding box 720 when all sample points in a row or column of sample points may be excluded. For example, a row of sample points that includes sample points 712 and 714 may be excluded, as a whole, since sample points 712 and 714 may each be excluded, as discussed above.

SMP 310 also constructs an additional line for each sample point that is parallel to edge 702C of triangle 702, as described in greater detail below in conjunction with FIG. 7C.

Figure 7C:
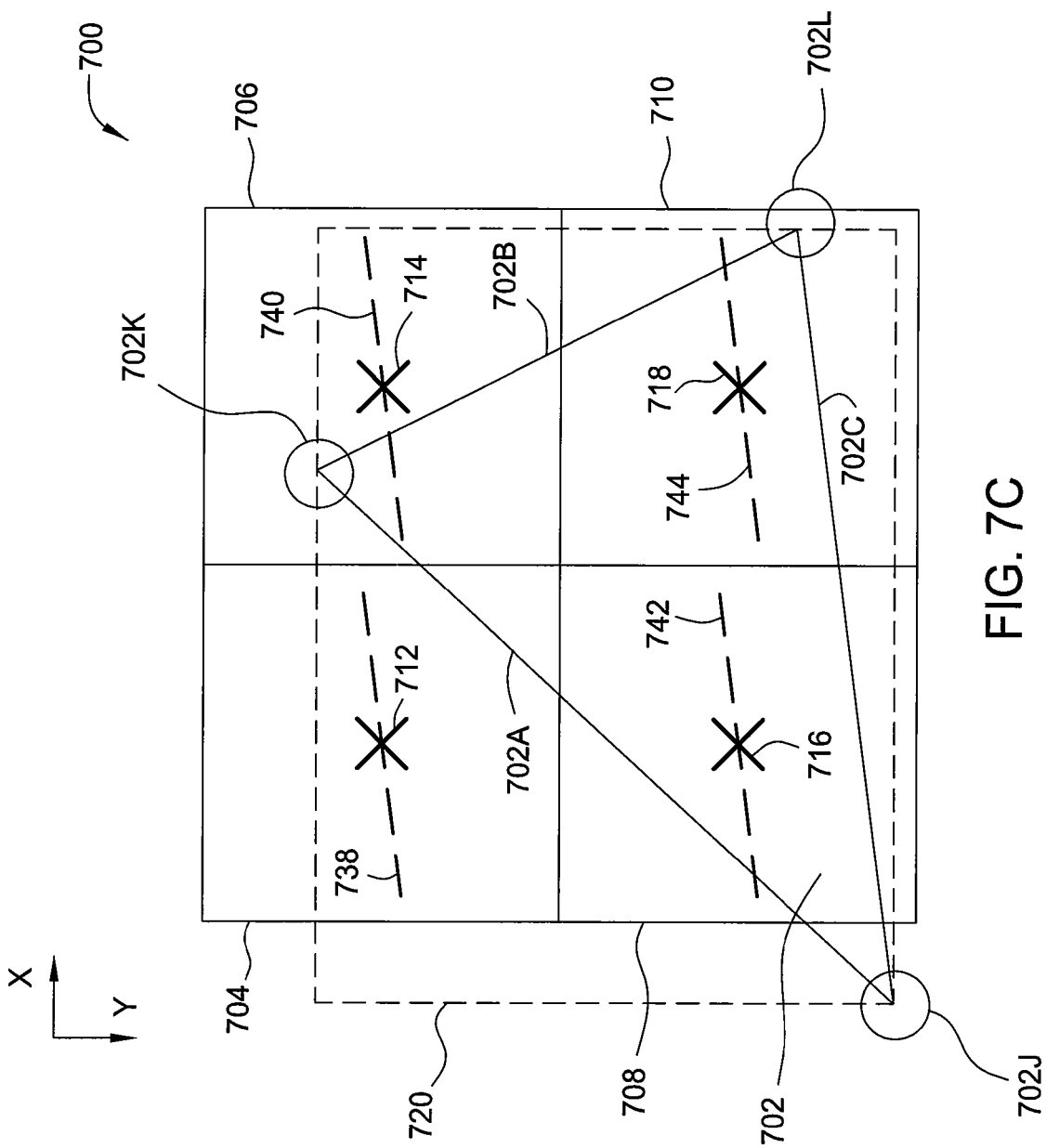

FIG. 7C illustrates conceptual diagram 700 of FIGS. 7A-7B in greater detail, according to one embodiment of the invention. As shown, conceptual diagram 700 includes some of the same elements as shown in FIGS. 7A-7B. In addition, conceptual diagram 700 includes lines 738, 740, 742, and 744 that cross sample points 712, 714, 716, and 718, respectively, and are each substantially parallel to edge 702C of triangle 702. As shown, no additional sample points can be excluded from bounding box 720.

As discussed above in conjunction with FIG. 7B, since sample point 712 may be excluded from bounding box 720 based on the comparison described in conjunction with FIG. 7A, SMP 310 may forego constructing line 738 in certain embodiments. Likewise, since sample point 714 may be excluded from bounding box 720 based on the comparison described above in conjunction with FIG. 7B, SMP 310 may forego constructing line 740 in certain embodiments. In those embodiments, SMP 310 may only construct lines for sample points that have not already been excluded from bounding box 720

As with conceptual diagram 600 described above in conjunction with FIG. 6, SMP 310 may construct lines 722, 724, 726, 728, 730, 732, 734, 736, 738, 740, 742, and 744 shown in FIGS. 7A-7C by determining a set of equations that describe those lines. Accordingly, those skilled in the art will recognize that lines 722, 724, 726, 728, 730, 732, 734, 736, 738, 740, 742, and 744 are illustrated conceptually as line segments having finite length for the sake of simplicity.

In some situations, SMP 310 may determine that a given triangle covers none of the sample points residing within a bounding box that surrounds the triangle. In such situations, SMP 310 may collapse the bounding box entirely and forego processing any pixels in conjunction with that triangle, as described in greater detail below in conjunction with FIGS. 8A-8C.

Figure 8A:
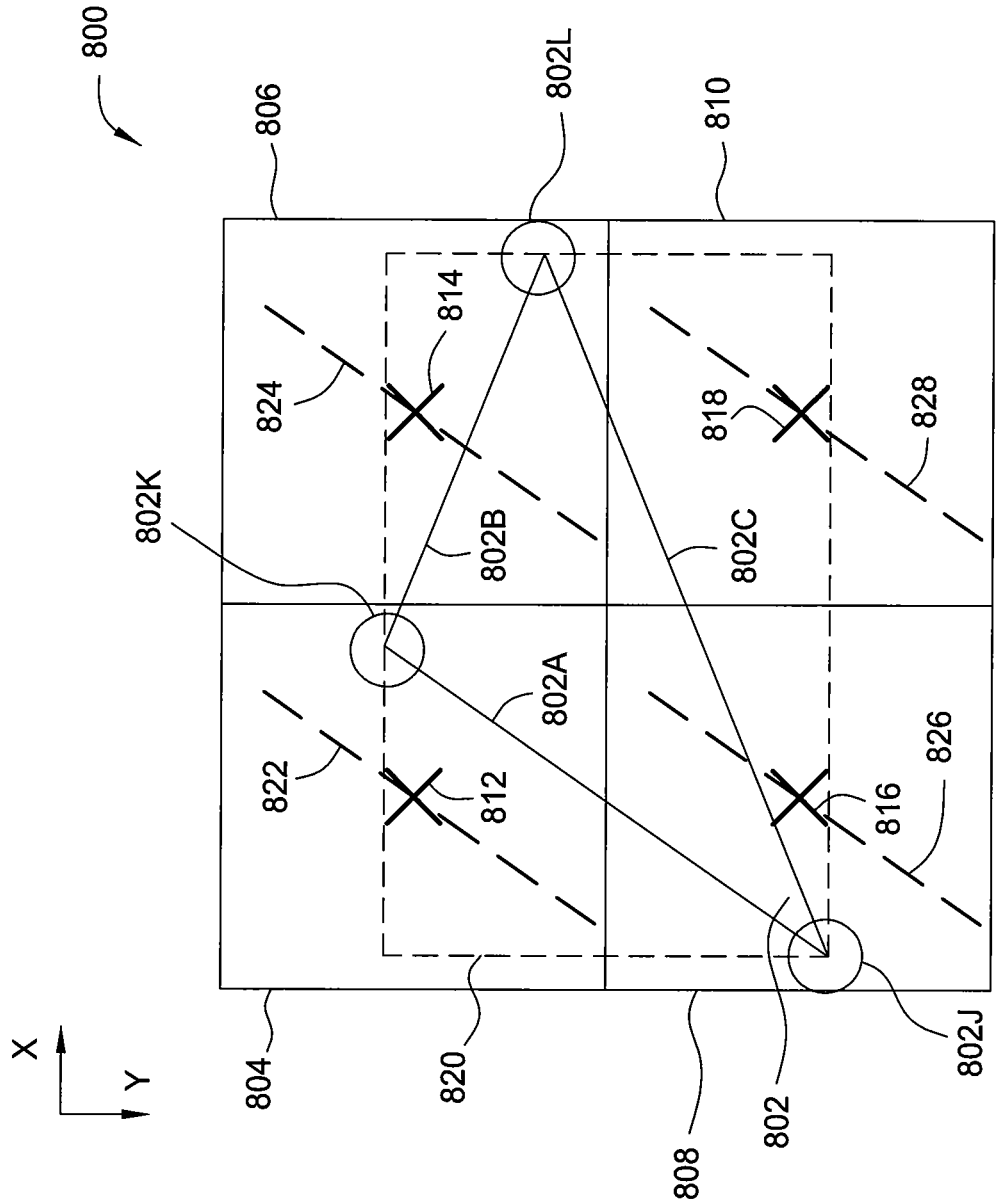
FIGS. 8A-8C are conceptual diagrams illustrating a technique for collapsing a bounding box, according to one embodiment of the invention.

FIG. 8A is a conceptual diagram illustrating a technique for collapsing a bounding box, according to one embodiment of the invention. As shown, conceptual diagram 800 includes a triangle 802 that partially covers pixels 804, 806, 808, and 810, and is surrounded by a bounding box 820. Triangle 802 includes edges 802A, 802B, and 802C, as well as vertices 802J, 802K, and 802L. Pixels 804, 806, 808, and 810 include sample points 812, 814, 816, and 818, respectively, that each represents a position within a corresponding pixel where the color value of the corresponding pixel may be sampled.

SMP 310 constructs lines 822, 824, 826, and 828 that cross sample points 812, 814, 816, and 818, respectively, and are each substantially parallel to edge 802A of triangle 802. Since all vertices 802J-802L of triangle 802 reside on one side of line 822, SMP 310 may reduce the size of bounding box 820 to exclude sample point 812. SMP 310 also constructs additional lines for each sample point that are parallel to one of edges 802B-802C of triangle 802, as described in greater detail below in conjunction with FIGS. 8B-8C.

Figure 8B:
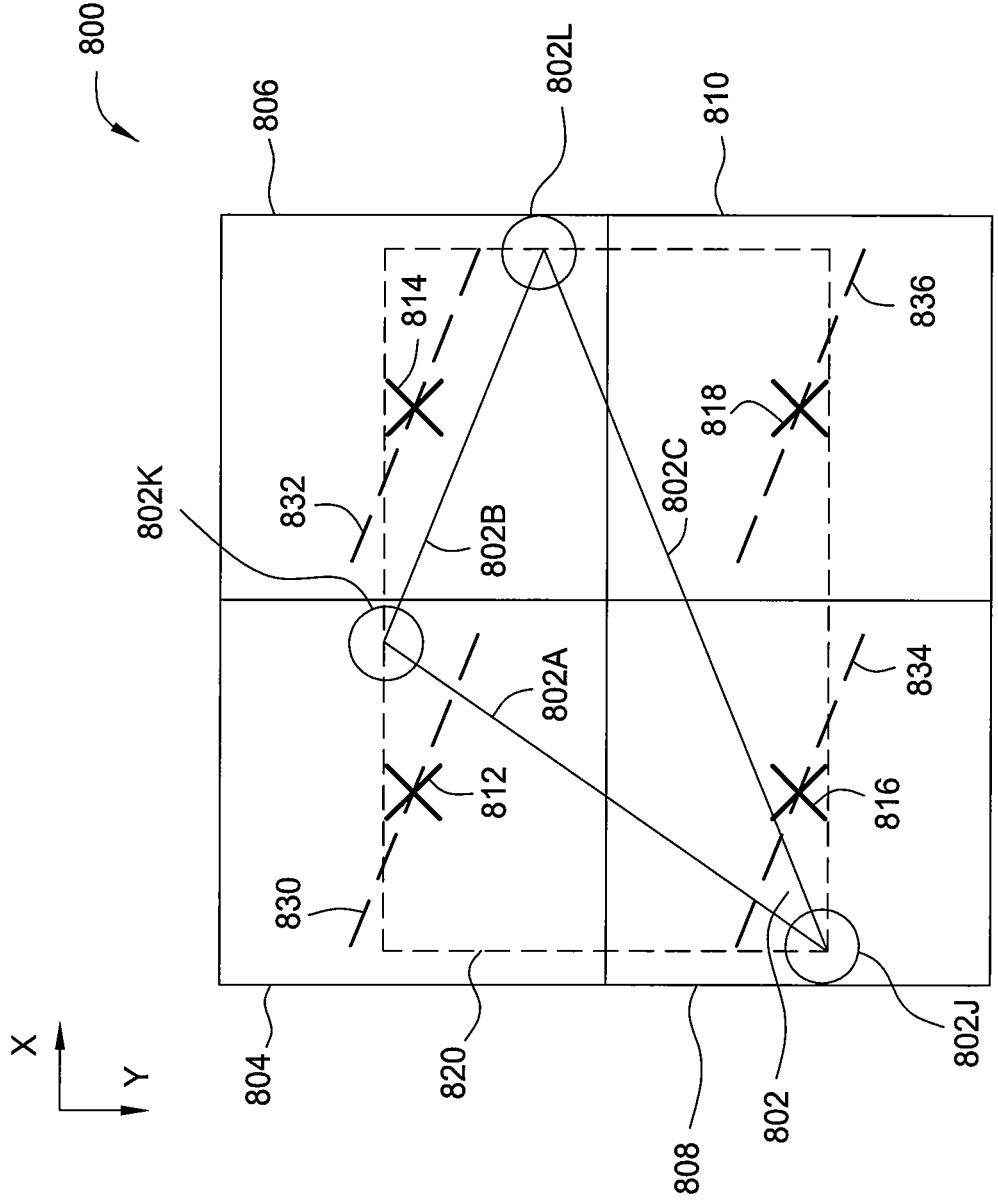

FIG. 8B illustrates conceptual diagram 800 of FIG. 8A in greater detail, according to one embodiment of the invention. As shown, conceptual diagram 800 includes some of the same elements as shown in FIG. 8A. In addition, conceptual diagram 800 includes lines 830, 832, 834, and 836 that cross sample points 812, 814, 816, and 818, respectively, and are each substantially parallel to edge 802B of triangle 802. Since all vertices 802J-802L of triangle 802 reside on one side of line 832, SMP 310 may reduce the size of bounding box 820 to exclude sample point 814.

As described in conjunction with conceptual diagram 700 shown in FIGS. 7A-7C, since sample point 812 may be excluded from bounding box 820 based on the comparison described in conjunction with FIG. 8A, SMP 310 may forego constructing line 830 in certain embodiments. SMP 310 also constructs an additional line for each sample point that is parallel to edge 802C of triangle 802, as described in greater detail below in conjunction with FIG. 8C.

Figure 8C:
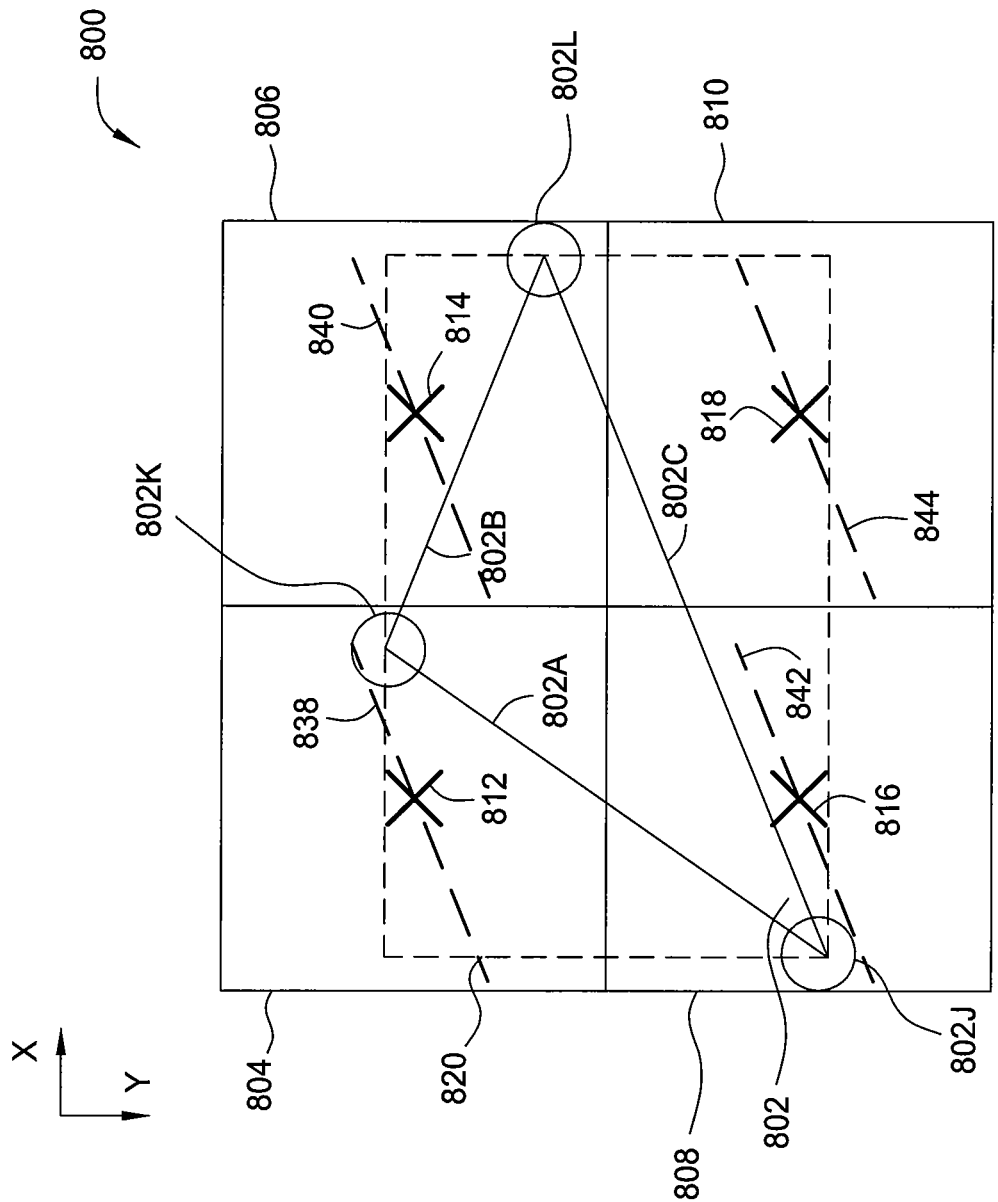

FIG. 8C illustrates conceptual diagram 800 of FIGS. 8A-8B in greater detail, according to one embodiment of the invention. As shown, conceptual diagram 800 includes some of the same elements as shown in FIGS. 8A-8B. In addition, conceptual diagram 800 includes lines 838, 840, 842, and 844 that cross sample points 812, 814, 816, and 818, respectively, and are each substantially parallel to edge 802C of triangle 802. Since all vertices 802J-802L of triangle 802 reside on one side of lines 842 and 844, SMP 310 may reduce the size of bounding box 820 to exclude sample points 816 and 818 corresponding to those lines. Since each of sample points 812, 814, 816, and 818 may be excluded from bounding box 820, SMP 310 may collapse bounding box 820 entirely and forego processing any of pixels 804, 806, 808, and 810 in conjunction with triangle 802.

Persons skilled in the art will recognize that the techniques described above in conjunction with FIGS. 6-8C are discussed conceptually for illustrative purposes only, and that any technically feasible approach to applying those techniques within a graphics processing pipeline falls within the scope of the present invention. Additionally, person skilled in the art will recognize that the aforementioned techniques could be implemented with three-dimensional N-sided volumes by way of two-dimensional planes that cross sample points associated with the volume parallel to a given surface of the volume.

In practice, when collapsing or reducing the size of a bounding box, SMP 310 processes each sample point within the bounding box to determine whether each sample point may be excluded from the bounding box, as described in greater detail below in conjunction with FIG. 9.

Figure 9:
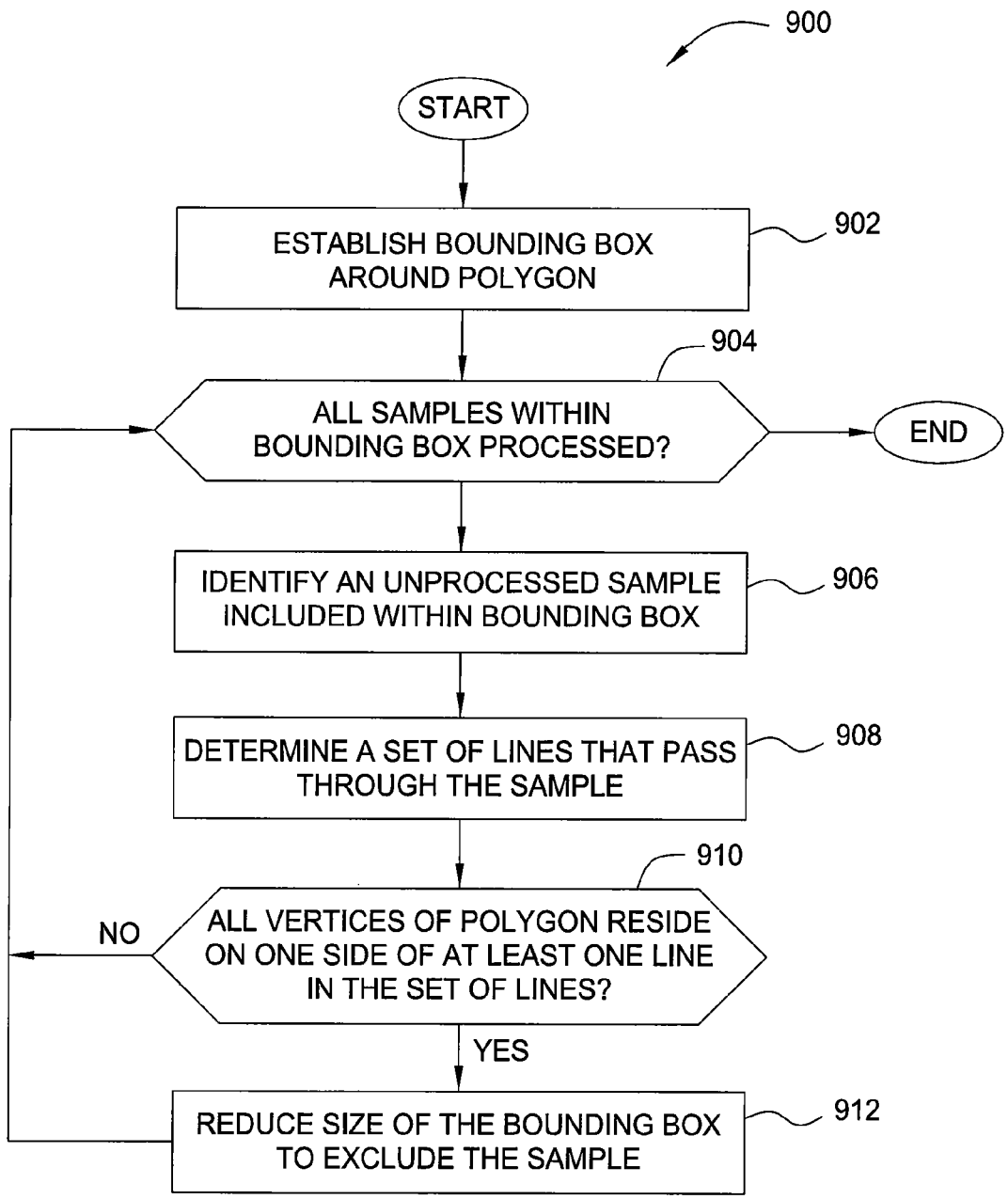
FIG. 9 is a flowchart of method steps for reducing the size of a bounding box, according to one embodiment of the invention.

FIG. 9 is a flowchart of method steps for reducing the size of a bounding box, according to one embodiment of the invention. Persons skilled in the art will understand that, although the method 900 is described in conjunction with the systems of FIGS. 1-4, and 6-8C, any system configured to perform the method steps, in any order, is within the scope of the present invention.

As shown, the method 900 starts at step 902, where SMP 310 establishes a bounding box around a polygon. The polygon may be, e.g., a triangle or any other type of N-edged polygon having N vertices. At step 904, SMP 310 determines whether all sample points within the bounding box have been processed. The bounding box may include any number of pixels, and each of those pixels may include any number of sample points. If SMP 310 determines that all sample points within the bounding box have been processed, then the method 900 ends. Otherwise, if SMP 310 determines that all sample points within the bounding box have not been processed, then the method proceeds to step 906.

At step 906, SMP 310 identifies an unprocessed sample point included within the bounding box. At step 908, SMP 310 constructs a set of lines that pass through the sample point. In one embodiment, the set of lines includes two lines that are perpendicular to one another and reside at a 45 degree angle to at least one edge of the pixel within which those lines reside. In another embodiment, the set of lines may include N lines that correspond to the N edges of the polygon, where each one of the N lines is substantially parallel to a different one of the N edges of the polygon.

In one embodiment, when constructing a line in the set of lines that corresponds to a particular edge of the polygon, SMP 310 selects a slope for the line from a finite set of possible slopes. In doing so, SMP 310 selects the slope from the set of possible slopes that has the closest slope to that of the corresponding edge of the polygon. In another embodiment, SMP 310 determines the slope of the line based on rounding the slope of the corresponding edge of polygon.

At step 910, SMP 310 determines whether all of the vertices of the polygon reside on one side of at least one line in the set of lines. If SMP 310 determines that all of the vertices of the polygon reside on one side of at least one line in the set of lines, then the method 900 returns to step 904. Otherwise, if SMP 310 determines that all of the vertices of the polygon reside on one side of at least one line in the set of lines, then the method 900 proceeds to step 912. At step 912, SMP 310 reduces the size of the bounding box to exclude the sample point. In practice, SMP 310 may reduce the size of the bounding box when all sample points within a given row or column should be excluded from the bounding box. In such a situation, SMP 310 may reduce the size of the bounding box to exclude the entire given row or column.

By implementing the method 900 repeatedly, SMP 310 may process each sample point within a bounding box that surrounds a polygon, and then collapse or reduce that bounding box to cull sample points not actually covered by the polygon. When SMP 310 culls a sample point, that sample point is not processed by the remainder of graphics processing pipeline 400.

In sum, a streaming multi-processor (SMP) establishes a bounding box around an N-edged polygon in order to identify sample points that are covered by the polygon. For each sample point included within the bounding box, the streaming multi-processor constructs a set of lines that intersect at the sample point and are parallel to at least one edge of the polygon. When all vertices of the polygon reside on one side of at least one line in the set of lines, the SMP may reduce the size of the bounding box to exclude the sample point.

Advantageously, sample points that are included within the bounding box but not actually covered by the polygon may be excluded from the bounding box, thereby reducing the number of sample points that need to be processed in conjunction with the polygon. By culling sample points in the fashion described above, 20% to 40% of the polygons processed by the SMP may be culled, thereby improving the overall efficiency with which the SMP processes polygons.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for culling sample points associated with a polygon having N edges and N vertices, the method comprising:
   establishing a bounding box that encompasses the polygon;
   identifying a plurality of sample points included within the bounding box;
   for each sample point included in the plurality of sample points:
   constructing a set of multiple lines that intersect one another at the sample point, wherein each line included in the set of multiple lines is parallel to at least one corresponding line constructed to intersect each other sample point included in the plurality of sample points;
   determining that the sample point resides outside the polygon by determining that all of the N vertices of the polygon reside on a first side of any of the lines included in the set of multiple lines that intersect one another at the sample point; and
   upon determining that the sample point lies outside the polygon, reducing the size of the bounding box until the sample point is excluded from the bounding box.

2. The computer-implemented method of claim 1, wherein the set of multiple lines comprises two lines positioned substantially perpendicular to one another, wherein each of the two lines is positioned at a substantially 45 degree angle relative to at least one edge of a pixel that includes the sample point.

3. The computer-implemented method of claim 1, wherein the set of multiple lines includes N lines, each of the N lines is substantially parallel to a different one of the N edges of the polygon, N being an integer.

4. The computer-implemented method of claim 1, wherein constructing the set of multiple lines comprises:
   determining N slope values, wherein each of the N slope values corresponds to a different one of the N edges of the polygon;
   rounding each of the N slope values to generate N rounded slope values; and
   constructing N lines to generate the set of multiple lines, wherein each of the N lines is associated with a different one of the N rounded slope values, N being an integer.

5. The computer-implemented method of claim 1, further comprising:
   constructing a different set of multiple lines for each of the other sample points included within the bounding box;
   determining that each of the N vertices of the polygon resides on one side of any of the lines in each of the different sets of multiple lines; and culling each of the other sample points by collapsing the bounding box.

6. The computer-implemented method of claim 1, wherein the sample point is one of a plurality of sample points residing within a pixel.

7. The computer-implemented method of claim 1, wherein the polygon comprises a triangle.

8. A non-transitory computer-readable medium storing program instructions that, when executed by a processing unit, cause the processing unit to cull sample points associated with a polygon having N edges and N vertices by performing the steps of:
    establishing a bounding box that encompasses the polygon;
    identifying a plurality of sample points included within the bounding box;
    for each sample point included in the plurality of sample points:
        constructing a set of multiple lines that intersect one another at the sample point, wherein each line included in the set of multiple lines is parallel to at least one corresponding line constructed to intersect each other sample point included in the plurality of sample points;
        determining that the sample point resides outside the polygon by determining that all of the N vertices of the polygon reside on a first side of any of the lines included in the set of multiple lines that intersect one another at the sample point; and
    upon determining that the sample point lies outside the polygon, reducing the size of the bounding box until the sample point is excluded from the bounding box.

9. The non-transitory computer-readable medium of claim 8, wherein the set of multiple lines comprises two lines positioned substantially perpendicular to one another, wherein each of the two lines is positioned at a substantially 45 degree angle relative to at least one edge of a pixel that includes the sample point.

10. The non-transitory computer-readable medium of claim 8, wherein the set of multiple lines includes N lines, each of the N lines is substantially parallel to a different one of the N edges of the polygon, N being an integer.

11. The non-transitory computer-readable medium of claim 8, wherein the step of constructing the set of multiple lines comprises:
    determining N slope values, wherein each of the N slope values corresponds to a different one of the N edges of the polygon;
    rounding each of the N slope values to generate N rounded slope values; and
    constructing N lines to generate the set of multiple lines, wherein each of the N lines is associated with a different one of the N rounded slope values, N being an integer.

12. The non-transitory computer-readable medium of claim 8, further comprising the steps of:
    constructing a different set of multiple lines for each of the other sample points included within the bounding box;
    determining that each of the N vertices of the polygon resides on one side of any of the lines in each of the different sets of multiple lines; and
    culling each of the other sample points by collapsing the bounding box.

13. The non-transitory computer-readable medium of claim 8, wherein the sample point is one of a plurality of sample points residing within a pixel.

14. The non-transitory computer-readable medium of claim 8, wherein the polygon comprises a triangle.

15. A computing device configured to cull sample points associated with a polygon having N edges and N vertices, comprising:
    a processing unit configured to:
        establish a bounding box that encompasses the polygon;
        identify a plurality of sample points included within the bounding box;
        for each sample point included in the plurality of sample points:
            construct a set of multiple lines that intersect one another at the sample point, wherein each line included in the set of multiple lines is parallel to at least one corresponding line constructed to intersect each other sample point included in the plurality of sample points;
            determine that the sample point resides outside the polygon by determining that all of the N vertices of the polygon reside on a first side of any of the lines included in the set of multiple lines that intersect one another at the sample point; and
        upon determining that the sample point lies outside the polygon, reduce the size of the bounding box until the sample point is excluded from the bounding box.

16. The computing device of claim 15, further comprising:
    a memory coupled to the processing unit and storing program instructions that, when executed by the processing unit, cause the processing unit to:
        establish the bounding box;
        identify the sample point;
        construct the set of multiple lines;
        determine that all of the N vertices of the polygon reside on a first side of at least one line included in the set of multiple lines; and
        reduce the size of the bounding box until the sample point is excluded from the bounding box.

17. The computing device of claim 15, wherein the set of multiple lines comprises two lines positioned substantially perpendicular to one another, wherein each of the two lines is positioned at a substantially 45 degree angle relative to at least one edge of a pixel that includes the sample point.

18. The computing device of claim 15, wherein the set of multiple lines includes N lines, each of the N lines is substantially parallel to a different one of the N edges of the polygon, N being an integer.

19. The computing device of claim 15, wherein the processing unit is configured to construct the set of multiple lines by:
    determining N slope values, wherein each of the N slope values corresponds to a different one of the N edges of the polygon;
    rounding each of the N slope values to generate N rounded slope values; and
    constructing N lines to generate the set of multiple lines, wherein each of the N lines is associated with a different one of the N rounded slope values, N being an integer.

20. The computing device of claim 15, wherein the processing unit is further configured to:
    construct a different set of multiple lines for each of the other sample points included within the bounding box;
    determine that each of the N vertices of the polygon resides on one side of any of the lines in each of the different sets of multiple lines; and cull each of the other sample points by collapsing the bounding box.

\* \* \* \* \*